(12) United States Patent
Wood et al.

(10) Patent No.: US 6,312,219 B1
(45) Date of Patent: Nov. 6, 2001

(54) NARROW WAIST VANE

(75) Inventors: Peter J. Wood, Cincinnati; John J. Decker, Liberty Township; Gregory T. Steinmetz, Cincinnati; Mark J. Mielke, Blanchester; Kenneth E. Seitzer, Mason, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/434,344

(22) Filed: Nov. 5, 1999

(51) Int. Cl.⁷ .................................................. F01D 9/00
(52) U.S. Cl. ........................................ 415/191; 416/223 A
(58) Field of Search ........................... 415/191, 192, 415/208.1, 208.2, 210.1, 193, 194, 195; 416/223 R, 223 A, 243, DIG. 2, DIG. 5, 235, 228

(56) References Cited

U.S. PATENT DOCUMENTS

| | | |
|---|---|---|
| 2,801,790 * | 8/1957 | Doll, Jr. ............................ 415/192 |
| 4,585,395 | 4/1986 | Nourse et al. . |
| 4,682,935 | 7/1987 | Martin . |
| 4,726,737 | 2/1988 | Weingold et al. . |
| 4,784,575 | 11/1988 | Nelson et al. . |
| 5,088,892 | 2/1992 | Weingold et al. . |
| 5,167,489 | 12/1992 | Wadia et al. . |
| 5,249,922 | 10/1993 | Sato et al. . |
| 5,342,170 | 8/1994 | Elvekjaer et al. . |
| 5,482,433 * | 1/1996 | Norris et al. ...................... 415/210.1 |
| 5,641,268 | 6/1997 | Martin et al. . |
| 5,642,985 | 7/1997 | Spear et al. . |
| 5,947,683 * | 9/1999 | Kobayashi ......................... 415/208.1 |
| 6,079,948 * | 6/2000 | Sasaki et al. ..................... 415/208.1 |

* cited by examiner

Primary Examiner—Edward K. Look
Assistant Examiner—James McAleenan
(74) Attorney, Agent, or Firm—Andrew C. Hess; Rodney M. Young

(57) ABSTRACT

A compressor stator vane includes pressure and suction sides extending chordally between leading and trailing edges, and longitudinally between a root and a tip. The vane narrows in chord to a waist between the root and tip. The vane may also be bowed at its trailing edge in cooperation with the narrow waist.

27 Claims, 3 Drawing Sheets

NARROW WAIST VANE

The US Government may have certain rights in this invention pursuant to Contract No. N00019-96-C-0176 awarded by the US Department of the Navy.

BACKGROUND OF THE INVENTION

The present invention relates generally to gas turbine engines, and, more specifically, to compressors or fans therein.

In a turbofan aircraft gas turbine engine, air is pressurized in a fan and compressor during operation. The fan air is used for propelling an aircraft in flight. The air channeled through the compressor is mixed with fuel in a combustor and ignited for generated hot combustion gases which flow through turbine stages that extract energy for powering the fan and compressor.

A typical turbofan engine includes a multistage axial flow compressor which pressurizes the air sequentially to produce high pressure air for combustion. The compressed air is diffused and decelerates as it is compressed. Compressor airfoils must therefore be designed to reduce undesirable flow separation which would adversely affect stall margin and efficiency.

Conversely, combustion gases are accelerated through the turbine stages, and the turbine blades have different aerodynamic designs for maximizing efficiency of energy extraction.

Fundamental in compressor design is efficiency in compressing the air with sufficient stall margin over the entire flight envelope of operation from takeoff, cruise, and landing.

However, compressor efficiency and stall margin are normally inversely related, with increasing efficiency typically corresponding with decrease in stall margin. The conflicting requirements of stall margin and efficiency are particularly demanding in high performance military engine applications, as opposed to less demanding commercial applications, which require high level of stall margin typically at the expense of compressor efficiency.

Maximizing efficiency of compressor airfoils is primarily effected by optimizing the velocity distributions over the pressure and suction sides of the airfoil. However, efficiency is typically limited in conventional compressor design by the requirement for a suitable stall margin. Any further increase in efficiency typically results in a reduction in stall margin, and, conversely, further increase in stall margin results in decrease in efficiency.

High efficiency is typically obtained by minimizing the wetted surface area of the airfoils for a given stage to correspondingly reduce airfoil drag. This is typically achieved by reducing airfoil solidity or the density of airfoils around the circumference of a rotor disk, or by increasing airfoil aspect ratio of the chord to span lengths.

For a given rotor speed, this increase in efficiency reduces stall margin. To achieve high levels of stall margin, a higher than optimum level of solidity may be used, along with designing the airfoils at below optimum incidence angles. This reduces axial flow compressor efficiency.

Increased stall margin may also be obtained by increasing rotor speed, but this in turn reduces efficiency by increasing the airfoil Mach numbers, which increases airfoil drag.

Compressor performance is also affected by the cooperation of compressor rotor blades and stator vanes. A row of blades extends radially outwardly from a supporting rotor disk and rotates during operation within a surrounding stator casing. A corresponding row of stator vanes is disposed directly upstream from the blades for controlling airflow thereto.

The stator vanes typically have radially outer tips mounted in an annular outer band, and radially inner roots suitably mounted in a radially inner band which typically supports an inner seal. Such mounting is typically effected by stabbing the individual vanes through complementary apertures in the bands, and securing the vanes thereto by brazing or welding for example. The individual vanes are typically straight and rigid for undergoing this manufacturing process without distortion.

However, typical vanes have relatively uniform radial profiles from root to tip and limit efficiency of operation and stall margin. The bands define endwalls along which boundary layers of air form during operation and affect performance. Aerodynamic or diffusion loading of the vanes is higher near the endwalls than the midspan regions of the vanes, and the vane-endwall interfaces are subject to flow separation along the vane suction sides near the trailing edges as the air diffuses during operation.

Accordingly, typical compressor design necessarily includes a compromise between efficiency and stall margin favoring one over the other. And, differences in blade and vane designs additionally complicate compressor design. It is, therefore, desired to further improve both compressor efficiency and stall margin by enhancing compressor vanes and improving cooperation with corresponding compressor blades.

BRIEF SUMMARY OF THE INVENTION

A compressor stator vane includes pressure and suction sides extending chordally between leading and trailing edges, and longitudinally between a root and a tip. The vane narrows in chord to a waist between the root and tip. The vane may also be bowed at its trailing edge in cooperation with the narrow waist.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
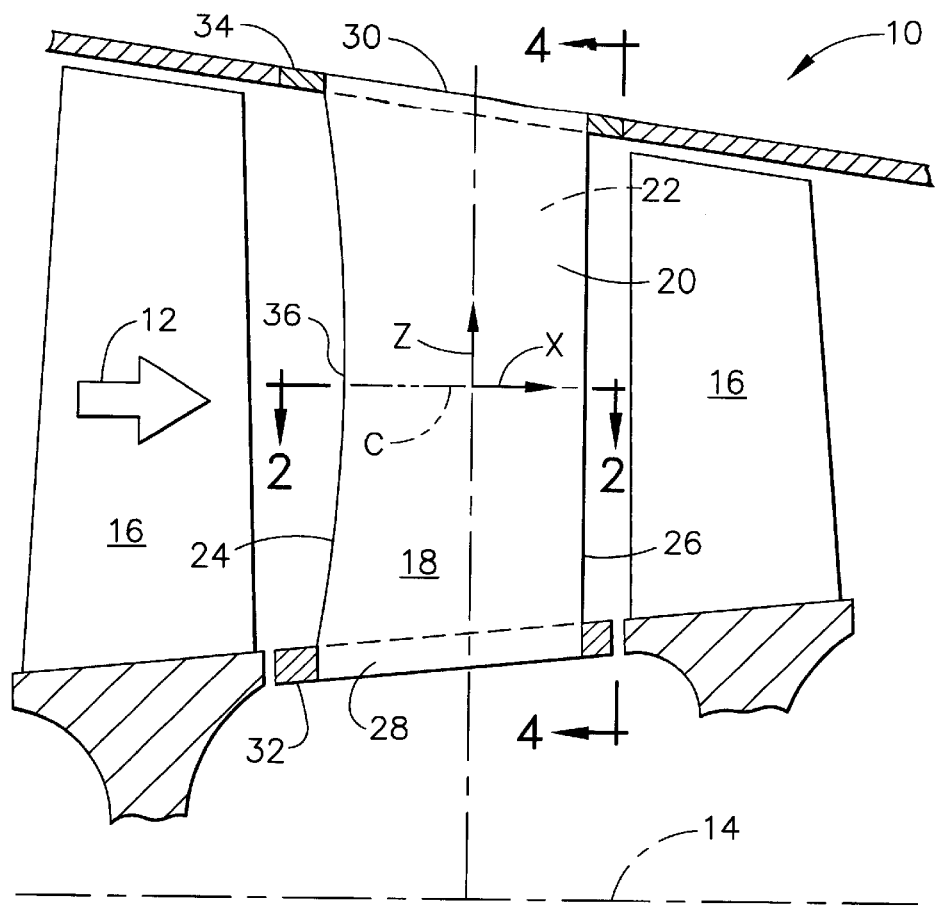
FIG. 1 is an axial sectional view through a portion of a gas turbine engine compressor including a row of stator vanes disposed axially between corresponding rows of rotor blades in accordance with an exemplary embodiment of the present invention.

Illustrated in side elevational view in FIG. 1 is a portion of a gas turbine engine compressor 10 configured for channeling and pressurizing air 12. The compressor is axisymmetrical about an axial centerline axis 14 and includes multiple axial stages of corresponding rotor blades 16 extending radially outwardly from corresponding rotors in the form of separate disks, or integral blisks, or annular drums in any conventional manner.

Cooperating with each rotor stage is a corresponding compressor stator having a plurality of circumferentially spaced apart stator vanes 18. The blade 16 and vanes 18 define airfoils having corresponding aerodynamic profiles or contours for pressurizing the air 12 successively in axial stages. In operation, pressure of the air is increased as the air decelerates and diffuses in the axial direction from stage to stage.

Figure 2:
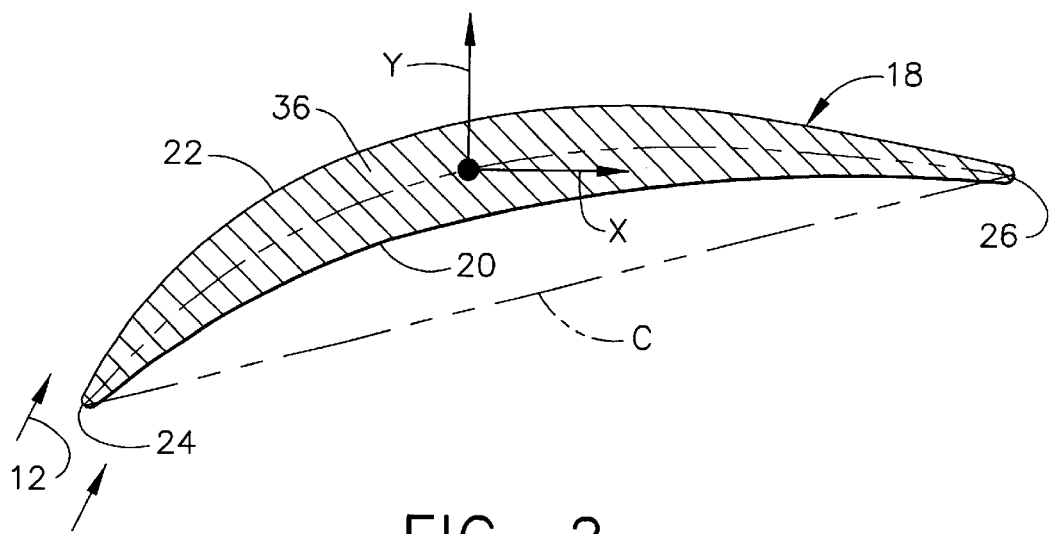
FIG. 2 is a radial sectional view through one of the compressor vanes illustrated in FIG. 2 and taken along 2—2.

As shown in FIGS. 1 and 2, each stator vane 18 defines an airfoil including a generally concave pressure side 20 and a circumferentially opposite, generally convex suction side 22. The two sides 20,22 extend chordally between an upstream leading edge 24 and an axially opposite, downstream trailing edge 26.

The individual vanes 18 may be defined relative to an orthogonal coordinate system including an axial axis X extending parallel with the engine centerline axis 14; a tangential or circumferentially extending axis Y; and a radially extending axis Z. Each vane 18 may therefore be defined by a plurality of radially stacked planar sections extending radially outwardly from a root 28 and a tip 30 as shown in FIG. 1.

In the exemplary embodiment illustrated in FIG. 1, the row of vanes 18 is suitably supported in corresponding radially inner and outer bands 32,34, with the inner band typically supporting a suitable seal (not shown). The vane roots 28 and tips 30 are typically fixedly mounted in complementary apertures in the corresponding bands 32,34, with the bands defining endwalls which radially bound the flow of air 12 between the adjacent vanes 18.

As indicated above, conventional compressor design typically requires a compromise in compression efficiency and stall margin. The airfoils of conventional compressor vanes are typically radially similar due to two dimensional aerodynamic definition thereof.

Modem computer software is now conventionally available for solving three-dimensional (3D) viscous flow equations for more fully evaluating airfoil performance. Such 3D software may be used for designing both the rotor blade 16 and the stator vanes 18, with the stator vanes being the subject of the present invention. The resulting vane airfoils in accordance with the present invention generally have distinctive 3D configurations which differ significantly over conventional airfoils which vary little in radial section over the longitudinal or radial spans thereof.

As initially shown in FIG. 2, each radial section of the vane 18 is defined by the aerodynamic contour or profile along the pressure and suction sides 20,22 extending between the leading and trailing edges 24,26. Each section has a chord extending from leading to trailing edge, and identified by its chord length C.

As shown in FIG. 1, and in accordance with an exemplary feature of the present invention, the stator vane 18 narrows in chord to a waist 36 of minimum chord length which is preferably disposed centrally between the root 28 and tip 30 along the longitudinal or radial span of the vane.

The leading edge 24 is preferably tapered toward the waist 36 from both the root 28 and the tip 30, with a generally concave axial side view or projection as illustrated in FIG. 1 defining a leading edge having a single scallop. The waist 36 is preferably disposed within a range of about 30%–70% of the longitudinal or radial span of the vane from its root 28. In the preferred embodiment illustrated, the waist 36 is disposed at about 50% span. And, the waist 36 may be up to about 30% less than the root and tip chords.

As shown in side view or axial projection in FIG. 1, the trailing edge 26 is preferably generally straight longitudinally or radially between the root and tip. In axial projection from either vane side, the trailing edge 26 appears straight in both the pressure and suction sides in the X-Z plane.

As further discussed hereinbelow, the stator vane 18 preferably narrows in chord solely from the leading edge 24 toward the trailing edge 26, with the trailing edge remaining straight in axial profile. In the preferred embodiment, the trailing edge 26 is configured to extend solely radially in axial elevation or projection without inclination with the leading edge. In this way, the waist 36 is defined solely by the tapered or scalloped leading edge 24, with the trailing edge being straight radially and without scallop.

By introducing the narrow waist 36 centrally in the vane by reducing chord length from both endwalls, improved 3D performance of the stator stage may be effected. The narrow midspan or central portion of the vane has a corresponding reduction in wetted surface area, and therefore aerodynamic drag is correspondingly reduced.

Preferably, the vane narrows to its waist with a corresponding shortening of the chords from both endwalls for effecting a substantially uniform diffusion loading longitudinally or radially from root 28 to tip 30. By defining the radial chord distribution of the vane to achieve a substantially uniform aerodynamic loading across the airfoil span, enhanced performance and efficiency may be obtained, while eliminating the extra chord length near the vane waist which is not required for efficient air compression.

The vane is selectively narrowed at the central waist to correspondingly increase loading and diffusion thereat without compromising loading and diffusion near the endwalls. The longitudinal loading distribution may be substantially uniform as indicated above, or may be slightly greater at vane midspan to ensure a smooth chord distribution. Compression efficiency is therefore increased by increasing diffusion in the vane central region, while correspondingly decreasing drag thereat.

Furthermore, chord reduction is preferably effected at the front or leading edge of the airfoil instead of the trailing edge to increase aerodynamic sweep of the leading edge at the endwall bands. Aerodynamic sweep is a conventional parameter and the forward sweep effected at the vane leading edge near the inner and outer bands 32–34 further improves aerodynamic performance of the vane.

Figure 3:
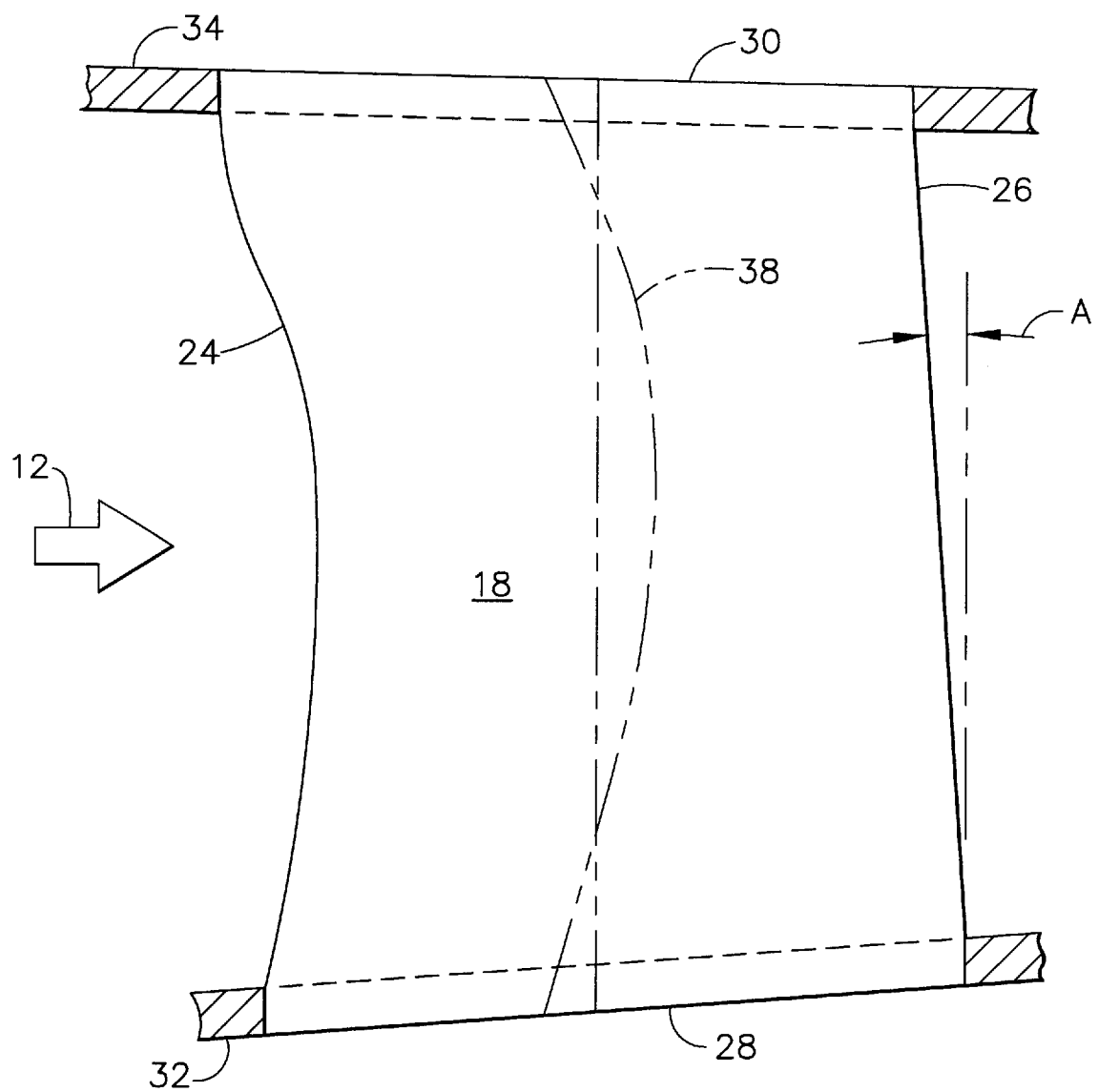
FIG. 3 is an axial, side elevational view, like FIG. 1, of the compressor vanes in accordance with an alternate embodiment of the present invention.

The scalloped leading edge 24 may also be effected with a straight but inclined trailing edge. As shown in an alternate embodiment in FIG. 3, the trailing edge 26 may remain straight in axial projection but may be inclined toward the leading edge 24 from root to tip at an acute inclination angle A which may be up to about 10°. The inclination angle A is preferably constant between the root and tip.

Figure 4:
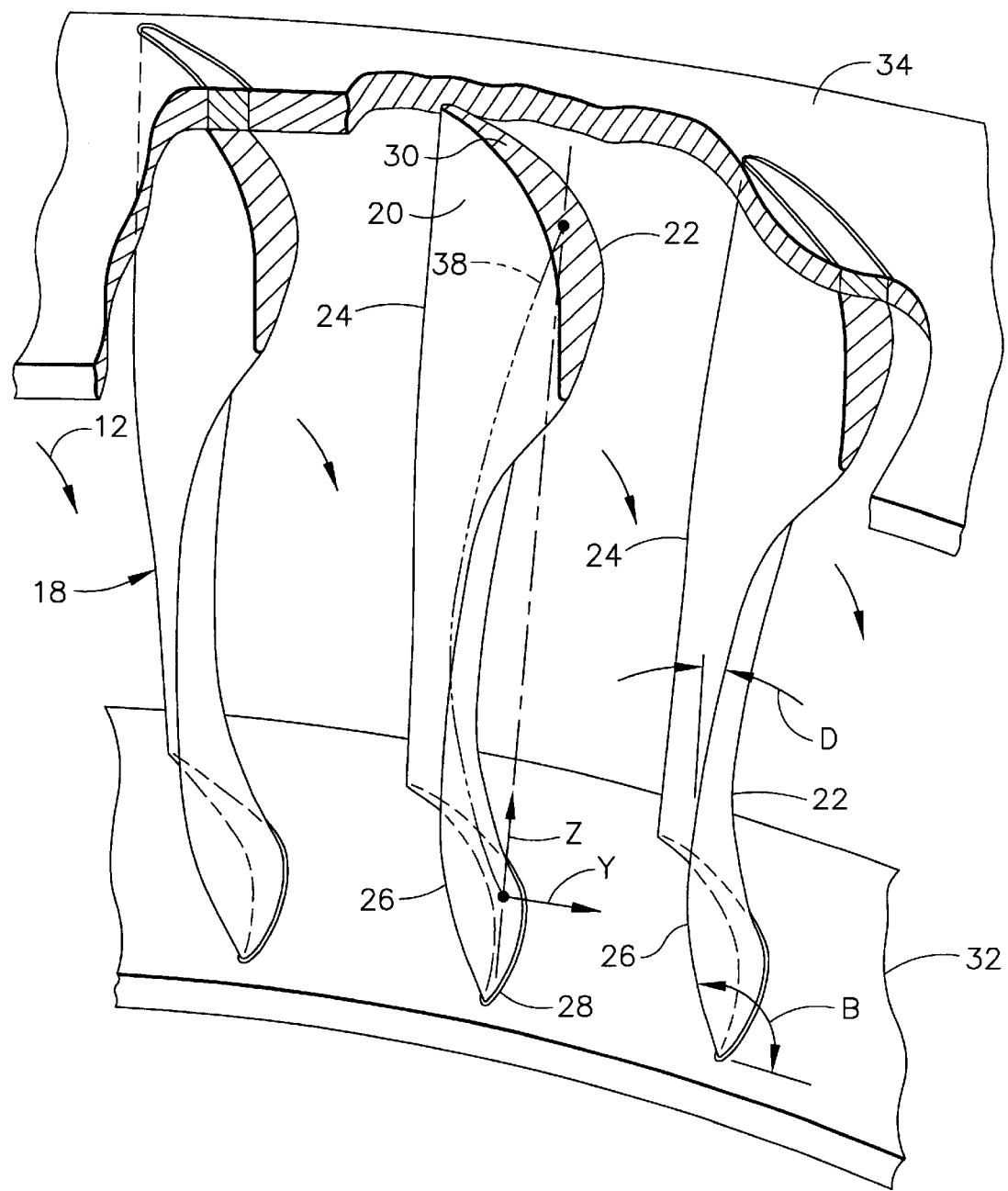
FIG. 4 is an upstream facing, isometric view of three adjacent compressor vanes mounted in corresponding radially inner and outer bands, and taken generally along line 4—4 in FIG. 1.

Compressor efficiency may be further increased, along with improved stall margin, by further modifying the vanes 18 as illustrated in tangential view or projection in the Y-Z plane illustrated in FIG. 4. The Y-Z plane illustrated in FIG. 4 is orthogonal or normal to the X-Z plane illustrated in FIG. 1 for showing two projections of the same vanes 18 corresponding with tangential and axial projections, respectively.

As shown in FIG. 4, the vane suction side 22 is preferably bowed at an obtuse angle B between the trailing edge 26 and each of the root 28 and tip 30. The trailing edge 26 also defines a lean angle D with the radial axis in the tangential direction or view illustrated.

Since the vanes 18 are configured to turn and diffuse the airflow 12, flow separation of the air is a design consideration primarily on the vane suction side near the trailing edge. In a conventional, generally radially straight stator vane, the vane suction side is generally normal to the corresponding endwalls and is subject to flow separation thereat. However, by bowing the suction side of the vanes 18 illustrated in FIG. 4 along the trailing edges, the resulting obtuse angles B can significantly reduce or eliminate undesirable flow separation at the endwalls or bands. Correspondingly, a further increase in compressor efficiency and stall margin may be obtained therefrom.

In the axial end view illustrated in FIG. 4, the individual vanes 18 are bowed primarily along their trailing edges 26 to create similar obtuse angles B at both the root 28 and tip 30. The lean angle D correspondingly varies over the longitudinal span of the vane to smoothly interconnect the oppositely inclined root and tip portions at the trailing edge. Preferably, the lean angle varies continuously between the root and tip.

The bowed trailing edge illustrated in FIG. 4 may be effected by varying the corresponding camber and stagger angle of each radial section, along with bowing the stacking axis 38 of the vane from a radial line, primarily in the tangential component thereof. The stacking axis for vanes is preferably the locus of mid-points of the camber lines of individual radial vane sections, which mid-points are typically radially aligned along the span of a vane. In FIG. 4, the tangential component of the stacking axis 38 is bowed and displaced from the radial span axis to effect the preferred bowed trailing edge of the vane.

The scalloped leading edge 24 illustrated in FIG. 1 is preferably used in combination with the bowed trailing edge 26 illustrated in FIG. 4, preferably without one compromising the other. The combination thereof further enhances aerodynamic efficiency, and the reduction or elimination of undesirable flow separation at the endwalls.

More specifically, the same vane 18 illustrated in FIGS. 1 and 4 preferably includes both the scalloped leading edge 24 with the central waist 36 of minimum chord, and the trailing edge 26 bowed orthogonally therefrom. As shown in FIG. 1, the trailing edge 26 is generally straight in the axial projection of the pressure and suction sides 20,22, as well as being bowed along the suction side 22 in the orthogonal tangential plane illustrated in FIG. 4. This combination of the trailing edge 26 in two orthogonal planes permits the amount of trailing edge lean D to be maximized, with a substantially large obtuse angle B for further improving compressor efficiency and stall margin.

The obtuse angle B may therefore be maximized within an exemplary range of about 100°–130°, with the 130° exemplary upper limit being chosen for manufacturing reasons as discussed hereinbelow. The large trailing edge bow cooperates with the scalloped leading edge with 3D synergy for maximizing the uniformity of diffusion loading longitudinally from the vane root 28 to tip 30. Uniform aerodynamic loading is effected also with a substantial reduction or elimination of flow separation between the vane suction side and corresponding endwalls at the trailing edge.

As shown in FIGS. 2 and 4, the vane leading edge 24 is preferably substantially normal or perpendicular to the corresponding root 28 and tip 30 and extends primarily in the radial direction.

Furthermore, the leading edge 24 is generally straight at the root and tip in the tangential plane illustrated in FIG. 4, which is orthogonal to the taper of the leading edge in the axial plane illustrated in FIG. 1.

Although the trailing edge portion of each vane is tangentially bowed as discussed above, the leading edge portions of the vanes are relatively straight for maintaining longitudinal rigidity of the vanes for permitting their assembly with the corresponding bands. Such assembly is typically effected by stabbing the individual vanes into complementary apertures in the bands with sufficient force to effect an interference fit therewith. The individual vanes therefore require longitudinal stiffness to prevent buckling or longitudinal distortion under the considerable stabbing forces employed.

The obtuse interface angle B illustrated in FIG. 4 is preferred locally at the vane trailing edge, and preferably decreases in magnitude from the trailing edge toward the leading edge 24. At the leading edge, the interface angle B approaches 90°. In this way, a significant portion of each vane may maintain a normal or perpendicular orientation relative to its opposite root and tip for maintaining radial stiffness thereof and permitting stabbing assembly of the vanes with the bands. The bowing of each vane may thusly be limited to the trailing edge region for enhancing aerodynamic performance without compromising manufacturability.

The scalloped and bowed stator vanes 18 illustrated in FIG. 4 thusly enjoy improved aerodynamic performance with their supporting bands 32,34. The obtuse interface angle B is effected between the vane suction side 22 and the trailing edge 26 at both endwalls 32,34. Flow separation thereat is significantly reduced or eliminated, and more uniform aerodynamic loading of the vanes across their radial spans is effected for further improving efficiency.

The scalloped and bowed features of the stator vanes may be used separately or in combination for maximizing efficiency and stall margin due to the synergistic combination thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A compressor stator vane comprising pressure and suction sides extending in a first plane chordally between leading and trailing edges, and longitudinally between a root and tip, and narrowing in chord to a waist therebetween, with said leading edge being generally straight in an orthogonal second plane.

2. A vane according to claim 1 wherein said leading edge is tapered toward said waist from said root and from said tip, and said waist is generally concave at midspan in said first plane.

3. A vane according to claim 2 wherein said waist is disposed within a range of about 30%–70% of longitudinal span from said root.

4. A vane according to claim 3 wherein said waist is disposed at about 50% span.

5. A vane according to claim 2 wherein said trailing edge is generally straight longitudinally from said root to said tip in said first plane.

6. A vane according to claim 5 wherein said trailing edge is generally straight in both said pressure and suction sides.

7. A vane according to claim 6 narrowing in chord solely from said leading edge, with said trailing edge being straight.

8. A vane according to claim 6 wherein said trailing edge is configured to extend solely radially in axial elevation without inclination with said leading edge in said first plane.

9. A vane according to claim 6 wherein said trailing edge is inclined toward said leading edge from said root to tip in said first plane.

10. A vane according to claim 9 wherein said trailing edge inclination is constant from said root to said tip.

11. A vane according to claim 2 wherein said chords shorten to said waist for effecting a substantially uniform diffusion loading longitudinally from said root to tip.

12. A vane according to claim 2 wherein said suction side is bowed at an obtuse angle between said trailing edge and each of said root and tip in said second plane.

13. A vane according to claim 12 wherein said trailing edge is generally straight in said pressure and suction sides in said first plane and orthogonal to said bow of said suction side thereat in said second plane.

14. A vane according to claim 12 wherein said obtuse angle is within a range of about 110°–130°.

15. A vane according to claim 12 wherein said chords shorten to said waist for effecting a substantially uniform diffusion loading longitudinally from said root to said tip.

16. A vane according to claim 12 wherein said leading edge is substantially normal to said root and tip in said second plane.

17. A vane according to claim 16 wherein said leading edge is generally straight between said root and tip in said second plane and orthogonal to said taper thereof in said first plane.

18. A vane according to claim 16 wherein said obtuse angle decreases in magnitude from said trailing edge toward said leading edge.

19. A vane according to claim 12 further comprising an inner band joined normal to said root in said second plane, and an outer band joined normal to said tip in said second plane for effecting said obtuse angle between said suction side at said trailing edge with both said bands.

20. A compressor stator vane comprising:

pressure and suction sides extending in a first plane chordally between leading and trailing edges, and longitudinally between a root and tip, and narrowing in chord to a waist therebetween, with said leading edge being generally straight in an orthogonal second plane; and said suction side is bowed at an obtuse angle between said trailing edge and each of said root and tip in said second plane.

21. A vane according to claim 20 further comprising an inner band joined normal to said root in said second plane, and an outer band joined normal to said tip in said second plane for effecting said obtuse angle between said suction side at said trailing edge with both said bands.

22. A vane according to claim 21 wherein:

said chords narrow solely from said leading edge; and said trailing edge is generally straight in said pressure and suction sides in said first plane and orthogonal to said bow of said suction side thereat in said second plane.

23. A vane according to claim 22 wherein said chords shorten to said waist for effecting a substantially uniform diffusion loading longitudinally from said root to tip.

24. A vane according to claim 22 wherein said waist is disposed within a range of about 30%–70% of longitudinal span from said root.

25. A vane according to claim 24 wherein said obtuse angle is within a range of about 100°–130°.

26. A vane according to claim 22 wherein said leading edge is generally straight between said root and tip in said second plane and orthogonal to said taper thereof in said first plane.

27. A compressor stator vane 18 comprising a scalloped leading edge with a waist of minimum chord in a first plane, and a trailing edge bowed orthogonally relative to said leading edge in an orthogonal second plane.

* * * * *